(12) United States Patent
Wu et al.

(10) Patent No.: US 11,825,505 B2
(45) Date of Patent: Nov. 21, 2023

(54) CHANNEL MEASUREMENT METHOD, USER EQUIPMENT, AND NETWORK SIDE DEVICE

(71) Applicant: VIVO MOBILE COMMUNICATION CO., LTD., Guangdong (CN)

(72) Inventors: Kai Wu, Dongguan (CN); Xueming Pan, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 358 days.

(21) Appl. No.: 17/196,666

(22) Filed: Mar. 9, 2021

(65) Prior Publication Data
US 2021/0195608 A1 Jun. 24, 2021

Related U.S. Application Data

(63) Continuation of application No. PCT/CN2019/102203, filed on Aug. 23, 2019.

(30) Foreign Application Priority Data

Sep. 10, 2018 (CN) .......................... 201811052619.1

(51) Int. Cl.
*H04W 72/08* (2009.01)
*H04B 7/06* (2006.01)
(Continued)

(52) U.S. Cl.
CPC ........ *H04W 72/542* (2023.01); *H04B 7/0626* (2013.01); *H04L 5/0051* (2013.01);
(Continued)

(58) Field of Classification Search
CPC ............. H04W 72/0453; H04W 24/10; H04W 72/542; H04W 80/02; H04L 25/0226;
(Continued)

(56) References Cited

U.S. PATENT DOCUMENTS

2010/0111224 A1    5/2010   Lim et al.
2014/0323144 A1   10/2014   Kim
(Continued)

FOREIGN PATENT DOCUMENTS

CN    103716116 A    4/2014
CN    105099634 A    11/2015
(Continued)

OTHER PUBLICATIONS

Written Opinion of the International Searching Authority dated Mar. 25, 2021 as received in Application No. PCT/CN2019/102203.
(Continued)

*Primary Examiner* — Brian D Nguyen
(74) *Attorney, Agent, or Firm* — Maschoff Brennan

(57) ABSTRACT

A channel measurement method, a terminal device, and a network side device are provided. The channel measurement method is applied in a user equipment (UE) and comprises: receiving M measurement reference signals sent by a network side device on the measurement resource, M being an integer greater than 1; the measurement resource comprising N measurement sub-resources; the measurement sub-resources being continuous in a time domain and a frequency domain; N being an integer greater than 1.

20 Claims, 8 Drawing Sheets

Receive M measurement reference signals sent by a network side device on a measurement resource, where M is an integer greater than 1; the measurement resource include N measurement sub-resources, and each measurement sub-resource is continuous in a time domain and a frequency domain, where N ≥ 1 and N is an integer — S201

Perform measurement and calculation for a channel according to the M measurement reference signals to obtain a channel measurement result; or, perform measurement and calculation for a channel according to the M measurement reference signals and a first measurement signal to obtain a channel measurement result, where the first measurement signal includes at least one of a secondary synchronization signal SSS in an SSB, a demodulation reference signal DMRS of a physical broadcast channel PBCH and a CSI-RS — S202

(51) Int. Cl.
  *H04L 5/00* (2006.01)
  *H04W 24/10* (2009.01)
  *H04W 56/00* (2009.01)
  *H04W 72/04* (2023.01)
  *H04W 72/12* (2023.01)
  *H04W 80/02* (2009.01)
  *H04W 72/542* (2023.01)
  *H04W 72/0446* (2023.01)
  *H04W 72/0453* (2023.01)
  *H04W 72/1263* (2023.01)

(52) U.S. Cl.
  CPC ......... *H04W 24/10* (2013.01); *H04W 56/001* (2013.01); *H04W 72/0446* (2013.01); *H04W 72/0453* (2013.01); *H04W 72/1263* (2013.01); *H04W 80/02* (2013.01)

(58) Field of Classification Search
  CPC ... H04L 5/0051; H04L 5/0048; H04L 5/0057; H04B 17/309; H04B 7/0626; Y02D 30/70
  See application file for complete search history.

(56) References Cited

U.S. PATENT DOCUMENTS

| | | | |
|---|---|---|---|
| 2015/0098346 A1 | 4/2015 | Guo et al. | |
| 2016/0164588 A1* | 6/2016 | Chen | H04B 7/0626 375/267 |
| 2017/0135105 A1 | 5/2017 | Li et al. | |
| 2018/0287681 A1 | 10/2018 | Chen et al. | |
| 2019/0052332 A1 | 2/2019 | Shimezawa | |
| 2019/0052337 A1* | 2/2019 | Kwon | H04W 74/006 |
| 2019/0074891 A1* | 3/2019 | Kwon | H04W 56/0005 |
| 2019/0200365 A1* | 6/2019 | Sampath | H04W 52/242 |
| 2019/0245603 A1 | 8/2019 | Yum | |
| 2019/0334682 A1 | 10/2019 | Zhang | |
| 2019/0356379 A1 | 11/2019 | Takeda | |
| 2021/0105066 A1* | 4/2021 | Uchiyama | H04B 7/2606 |

FOREIGN PATENT DOCUMENTS

| | | |
|---|---|---|
| CN | 106559836 A | 4/2017 |
| CN | 106559879 A | 4/2017 |
| CN | 107733486 A | 2/2018 |
| WO | 2017169008 A1 | 10/2017 |
| WO | 2018026230 A1 | 2/2018 |
| WO | 2018028459 A1 | 2/2018 |
| WO | 2018126855 A1 | 7/2018 |
| WO | 2018143390 A1 | 8/2018 |

OTHER PUBLICATIONS

CN Office Action dated Apr. 12, 2021 as received in Application No. 201811052619.1.
Japanese Office Action dated May 31, 2022 as received in application No. 2021-537456.
European Office Action dated Oct. 14, 2021 as received in application No. 19858939.2.
Korean Office Action dated Sep. 8, 2022 as received in application No. 10-2021-7010055.
"Physical layer procedures for data" 3GPP TS 38.214, Technical Specification Group Radio Access Network. Jun. 2018.

* cited by examiner

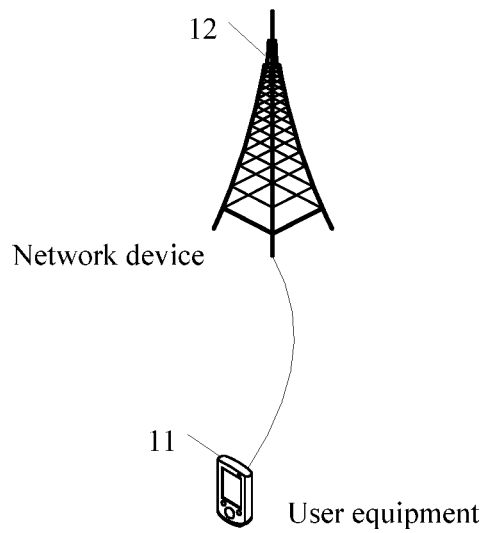
FIG. 1
Receive M measurement reference signals sent by a network side device on a measurement resource, where M is an integer greater than 1; the measurement resource include N measurement sub-resources, and each measurement sub-resource is continuous in a time domain and a frequency domain, where N ≥ 1 and N is an integer ⎯⎯ S201
FIG. 2
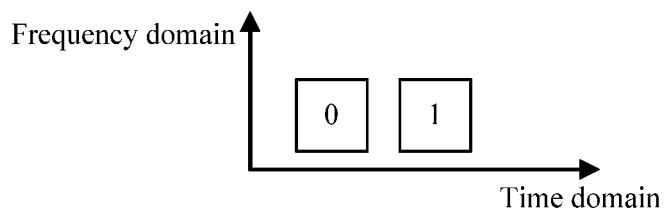
FIG. 3

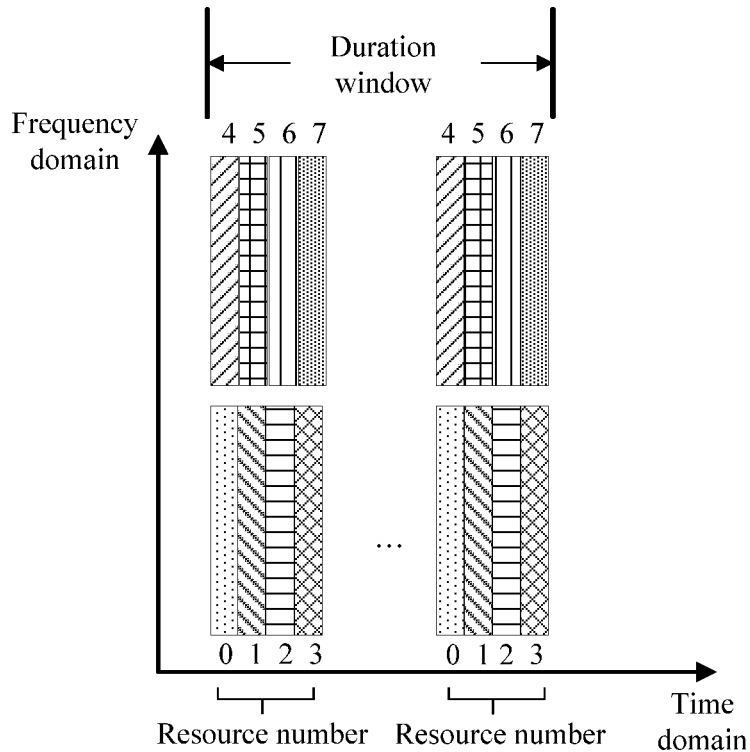

FIG. 13

| Receive M measurement reference signals sent by a network side device on a measurement resource, where M is an integer greater than 1; the measurement resource include N measurement sub-resources, and each measurement sub-resource is continuous in a time domain and a frequency domain, where N ≥ 1 and N is an integer | S201 |

| Perform measurement and calculation for a channel according to the M measurement reference signals to obtain a channel measurement result; or, perform measurement and calculation for a channel according to the M measurement reference signals and a first measurement signal to obtain a channel measurement result, where the first measurement signal includes at least one of a secondary synchronization signal SSS in an SSB, a demodulation reference signal DMRS of a physical broadcast channel PBCH and a CSI-RS | S202 |

FIG. 14

Send M measurement reference signals to user equipment UE on a measurement resource, where M is an integer greater than 1; the measurement resource includes N measurement sub-resources, and each measurement sub-resource is continuous in a time domain and a frequency domain, where N≥1 and N is an integer — S1501
FIG. 15
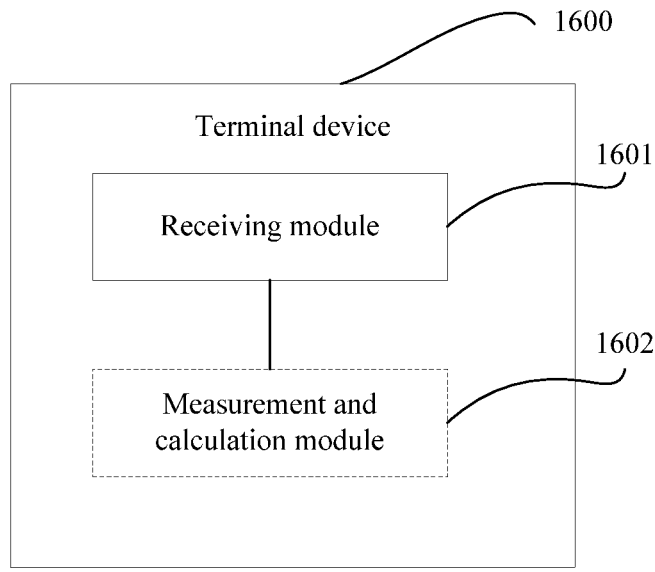
FIG. 16
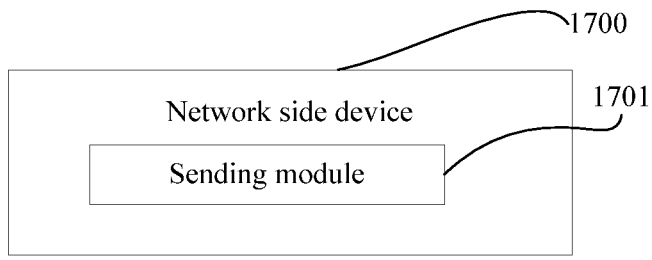
FIG. 17

CHANNEL MEASUREMENT METHOD, USER EQUIPMENT, AND NETWORK SIDE DEVICE

CROSS REFERENCE TO RELATED APPLICATIONS

This application is continuation application of PCT International Application No. PCT/CN2019/102203 filed on Aug. 23, 2019, which claims priority to Chinese Patent Application No. 201811052619.1 filed on Sep. 10, 2018 in China, the disclosures of which are incorporated in their entireties by reference herein.

TECHNICAL FIELD

The present disclosure relates to the field of communications technologies, and in particular, to a channel measurement method, user equipment, and a network side device.

BACKGROUND

In the 5G New Radio (NR) system, due to the introduction of large-scale antennas, a narrow beam can be used to cover a corresponding direction to obtain a beamforming gain and thus achieve better transmission performance. As the beam is narrow, it is required to send a reference signal used for measurement in multiple different beam directions, so that the user equipment (UE) can assess channel quality in the multiple beam directions.

In NR Rel-15, a network side device can send multiple synchronization signal blocks (Synchronization signal and PBCH block, SSB or SS/PBCH) or channel state information-reference signals (CSI-RS) for the UE to perform measurement. If different SSBs or CSI-RSs are sent in different beam directions, the UE utilizes measurement results of multiple resources and reporting feedbacks to assist the network in mobility management, such as measurement of radio resource management, radio link monitoring, beam failure detection, or channel state measurement.

As the UE needs to perform measurements on multiple measurement resources, the time occupied by a measurement operation during the time of signal processing by the UE significantly increases, and power consumption of the UE is increased when channel measurement is performed. Therefore, how to reduce the power consumption of the UE during channel measurement becomes an urgent technical problem to be solved.

SUMMARY

Embodiments of the present disclosure provide a channel measurement method, user equipment and a network side device, to resolve the problem of how to reduce power consumption of the UE during channel measurement.

To resolve the foregoing technical problem, the present disclosure is implemented as follows:

According to a first aspect, the present disclosure provides a channel measurement method, applied to user equipment UE, including: receiving M measurement reference signals sent by a network side device on a measurement resource, where M is an integer greater than 1, the measurement resource includes N measurement sub-resources, and each of the measurement sub-resources is contiguous in a time domain and a frequency domain, where $N \geq 1$ and N is an integer.

According to a second aspect, the present disclosure provides a channel measurement method, applied to a network side device, including: sending M measurement reference signals to user equipment UE on a measurement resource, where M is an integer greater than 1, the measurement resource includes N measurement sub-resources, and each of the measurement sub-resources is contiguous in a time domain and a frequency domain, where $N \geq 1$ and N is an integer.

According to a third aspect, the present disclosure provides user equipment, including: a receiving module, configured to receive M measurement reference signals sent by a network side device on a measurement resource, where M is an integer greater than 1, the measurement resource includes N measurement sub-resources, and each of the measurement sub-resources is contiguous in a time domain and a frequency domain, where $N \geq 1$ and N is an integer.

According to a fourth aspect, the present disclosure provides a network side device, including: a sending module, configured to send M measurement reference signals to user equipment UE on a measurement resource, where M is an integer greater than 1, the measurement resource includes N measurement sub-resources, and each of the measurement sub-resources is contiguous in a time domain and a frequency domain, where $N \geq 1$ and N is an integer.

According to a fifth aspect, the present disclosure provides user equipment, including a processor, a memory, and a program that is stored in the memory and that can run on the processor, where when the program is executed by the processor, steps of the channel measurement method according to the first aspect are implemented.

According to a sixth aspect, the present disclosure provides a network side device, including a processor, a memory, and a program that is stored in the memory and that can run on the processor, where when the program is executed by the processor, steps of the channel measurement method according to the second aspect are implemented.

According to a seventh aspect, the present disclosure provides a computer readable storage medium, where a program is stored in the computer readable storage medium, and when the program is executed by a processor, steps of the channel measurement method according to the first aspect, or steps of the channel measurement method according to the second aspect are implemented.

The beneficial effect of the present disclosure is that the present disclosure sets N measurement sub-resources on a measurement resource, and as each measurement sub-resource is contiguous in a time domain and a frequency domain, UE only needs to continuously receive measurement reference signals on the N measurement sub-resources in the time domain or frequency domain when performing channel measurement, thus reducing time for processing another signal when the UE performs the channel measurement, and reducing power consumption of the UE.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

FIG. 1 is a structural diagram of a channel measurement system according to an embodiment of the present disclosure;

FIG. 2 is a flowchart of a channel measurement method according to an embodiment of the present disclosure;

FIG. 3 is a schematic diagram of time-frequency distribution of a measurement resource according to an embodiment of the present disclosure;

FIG. 13 is a mapping mode of another measurement reference signal when the measurement reference signal is repeatedly sent according to an embodiment of the present disclosure;

FIG. 14 is a flowchart of another channel measurement method according to an embodiment of the present disclosure;

FIG. 15 is a flowchart of yet another channel measurement method according to an embodiment of the present disclosure;

FIG. 16 is a structural diagram of user equipment according to an embodiment of the present disclosure;

FIG. 17 is a structural diagram of a network side device according to an embodiment of the present disclosure;

DESCRIPTION OF EMBODIMENTS

Figure 4:
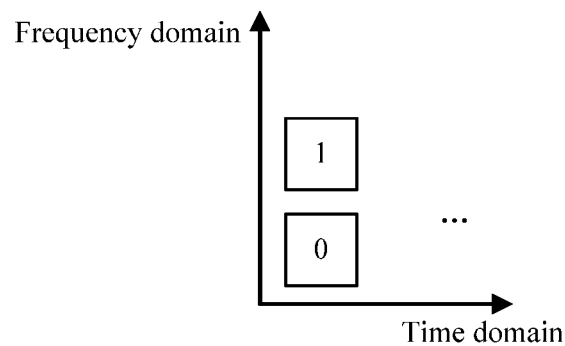
FIG. 4 is a schematic diagram of time-frequency distribution of another measurement resource according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first,", "second", and the like in the specification and claims of the present disclosure are used to distinguish similar objects, instead of describing a specific sequence or order. It should be understood that such used data is exchangeable in a proper case, so that the embodiments of the present disclosure described herein, for example, can be implemented in sequences other than those shown in the figures or described herein. In addition, terms "include", "have", and any variant thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in the specification and claims, "and/or" is used to indicate at least one of connected objects, for example, A and/or B and/or C indicates seven cases: only A, only B, only C, both A and B, both B and C, both A and C, and A, B and C.

The technology described herein is not limited to a Long Term Evolution (LTE)/LTE-Advanced (LTE-A) system, and may also be used in various radio communications systems, such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" are often used interchangeably. A CDMA system can implement radio technologies such as CDMA2000 and universal terrestrial radio access (UTRA). UTRA includes Wideband CDMA (WCDMA) and other CDMA variants. A TDMA system can implement radio technologies such as the Global System for Mobile Communications (GSM). An OFDMA system can implement radio technologies such as ultra mobile broadband (UMB), evolution-UTRA (E-UTRA), IEEE 802.11 (Wi-Fi), IEEE 802.16 (WiMAX), IEEE 802. 20, and Flash-OFDM. UTRA and E-UTRA are a part of Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2).

The technology described herein can be used in the systems and radio technologies mentioned above, as well as other systems and radio technologies. For example, the technology described herein is also applicable to a newly defined IoT communications system, a narrowband communications system, and a network side device or UE of a vehicle-mounted communications system.

However, the following description describes an NR system for an exemplary purpose, and NR terminology is used in most of the following description, in which the NR system is taken as an example, although these technologies may also be applied to an application other than an NR system application. A person skilled in the art may understand that the terms used constitute no limitation on the protection scope of the present disclosure.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described methods may be performed in an order different from that described, and various steps can be added, omitted, or combined. In addition, features described with reference to some examples may be combined in other examples.

FIG. 1 is a structural diagram of a channel measurement system applicable to an embodiment of the present disclosure. As shown in FIG. 1, it includes user equipment 11 and a network side device 12, where the user equipment 11 may be UE (User Equipment), such as a mobile phone, a tablet personal computer (Tablet Personal Computer), a laptop computer (Laptop Computer), a personal digital assistant (PDA), a mobile Internet device (MID), or a wearable device (Wearable Device). It should be noted that a specific type of the user equipment 11 is not limited in the embodiment of the present disclosure. The network side device 12 may be a base station of 5G or its later version (such as a gNB or a 5G NR NB) or a base station, which may be referred to as a NodeB, in another communications system. It should be noted that a specific type of the base station 12 is not limited in the embodiment of the present disclosure.

It should be noted that specific functions of the foregoing user equipment 11 and the network side device 12 are described in detail in the following by using multiple embodiments.

FIG. 2 is a flowchart of a channel measurement method according to an embodiment of the present disclosure. As shown in FIG. 2, an embodiment of the present disclosure provides a channel measurement method, which is applied to user equipment UE, and includes a step S201:

S201: Receive M measurement reference signals sent by a network side device on a measurement resource, where M is an integer greater than 1; the measurement resource includes N measurement sub-resources, and each measurement sub-resource is contiguous in a time domain and a frequency domain, where N≥1 and N is an integer.

In the embodiments of the present disclosure, the measurement resource refer to all resources in the time domain and frequency domain required by the network side device to send the M measurement reference signals.

As an alternative implementation manner of the embodiment of the present disclosure, the measurement resource is configured through one of the following instructed by high layer signaling, Media Access Control (MAC) layer control element (MAC Control Element, MAC CE), or downlink control information (DCI): a period, a frame, a sub-frame, a time slot, a symbol, a duration, a frequency domain position and a bandwidth of the measurement resource. It should be noted that the high layer signaling mentioned in the present disclosure includes system information and radio resource control (RRC) signaling.

In the embodiment of the present disclosure, the M measurement reference signals are signals sent independently by the network side device in M beam directions, so that the UE can assess channel quality in the M beam directions. In addition, all resource numbers of the M measurement reference signals are different. It should be noted that a specific value of M is not limited in the embodiment of the present disclosure, and as long as M is an integer greater than 1, it falls within the protection scope of the present disclosure. For example, the UE can receive 4 measurement reference signals sent by the network side device or 8 measurement reference signals sent by the network side device on a measurement resource.

In the embodiment of the present disclosure, the quantity of the measurement sub-resources N included in the measurement resource is predefined or configured by high layer signaling. For example, the high layer signaling can configure the quantity of the measurement sub-resources N to be 1, that is, the network side device sends the M measurement reference signals in one contiguous time domain and frequency domain, which can minimize time and/or a frequency domain resource for processing another signal, and cut down power consumption of the UE when performing channel measurement. The high-level signaling may also configure the quantity of the measurement sub-resources N to be 2 or another number.

As an alternative implementation manner of the embodiment of the present disclosure, the quantity of the measurement sub-resources N is less than the quantity of the measurement reference signals M, that is, N<M. In this alternative implementation manner, as the quantity of the measurement sub-resources N is less than the quantity of the measurement reference signals M, multiple measurement reference signals can be mapped on 1 measurement sub-resource, which reduces power consumption of the UE when receiving the measurement reference signals.

In the embodiment of the present disclosure, the measurement resource may include N measurement sub-resources in a time domain, and it is understandable that the N measurement sub-resources have a discontinuous breakpoint only in the time domain. As shown in FIG. 3, the measurement resource includes 2 measurement sub-resources (that is, measurement sub-resource 0 and measurement sub-resource 1) in a time domain.

In the embodiment of the present disclosure, the measurement resource may also include N measurement sub-resources in a frequency domain, and it is understandable that the N measurement sub-resources have a discontinuous breakpoint only in a frequency domain. As shown in FIG. 4, the measurement resource includes 2 measurement sub-resources (that is, measurement sub-resource 0 and measurement sub-resource 1) in a frequency domain. In a specific application, as the N measurement sub-resources occupy one continuous time period and the measurement resource is a very compact resource in the time domain, a time resource occupied by the M measurement reference signals after being mapped on the measurement resource are reduced, and time for the UE to receive the M measurement reference signals is reduced.

Figure 5:
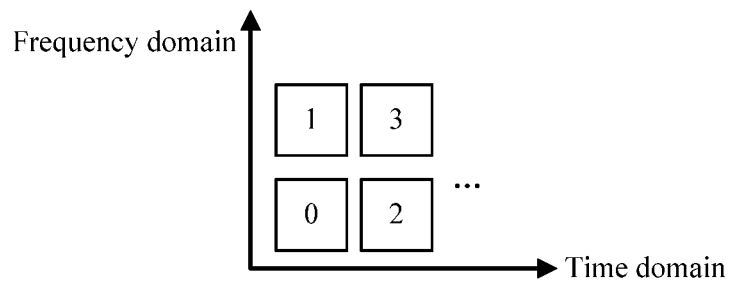
FIG. 5 is a schematic diagram of time-frequency distribution of yet another measurement resource according to an embodiment of the present disclosure.

In the embodiment of the present disclosure, the measurement resource may also include N measurement sub-resources in a time domain and a frequency domain, and it is understandable that the N measurement sub-resources have a discontinuous breakpoint in both the time domain and the frequency domain. As shown in FIG. 5, the measurement resource includes 4 measurement sub-resources (that is, measurement sub-resource 0, measurement sub-resource 1, measurement sub-resource 2, and measurement sub-resource 3) in a time domain and a frequency domain.

Figure 6:
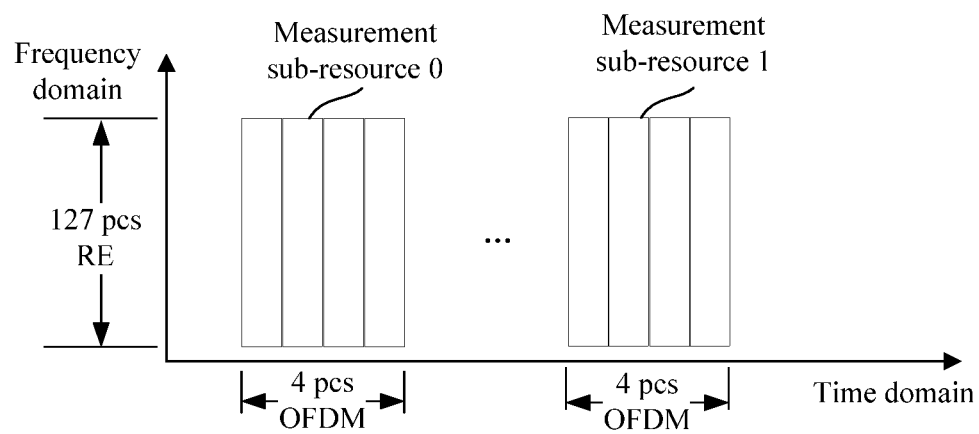
FIG. 6 is a schematic diagram of a measurement sub-resource configuration according to an embodiment of the present disclosure.

In the embodiment of the present disclosure, a duration of each measurement sub-resource in a time domain is predefined or configured by higher-layer signaling; and/or, a bandwidth of each measurement sub-resource in a frequency domain is predefined or configured by higher-layer signaling. In a specific application, if each measurement resource includes a quantity N=2 of measurement sub-resources in a time domain, that is, the measurement sub-resource includes measurement sub-resource 0 and measurement sub-resource 1, a duration of measurement sub-resource 0 or measurement sub-resource 1 in a time domain can be configured to be 4 orthogonal frequency division multiplexing (OFDM) symbols, and a bandwidth of 127 resource elements (RE) can be configured in a frequency domain, as shown in FIG. 6.

In the embodiments of the present disclosure, a position of each measurement sub-resource in the measurement resource is configured by high layer signaling. It should be noted that configuring a position of a measurement sub-resource is to determine the position of the measurement sub-resource in the measurement resource, and the position of the measurement sub-resource in the measurement resource includes a position in a time domain and a position in a frequency domain. In a specific application, the position of the measurement sub-resource in the measurement resource can be determined by configuring a starting position of the measurement sub-resource in the measurement resource or any another position, for example, a middle position of the measurement sub-resource can be configured.

As an alternative implementation manner of the embodiment of the present invention, a duration of the N measurement sub-resources in a time domain is less than a first value, where the first value is predefined or configured by higher layer signaling. In a specific application, the predefined first value may be 2 ms, 5 ms, or another value, which is not specifically limited in the embodiment of the present disclosure. Power consumption of the UE during channel measurement is reduced by pre-defining or configuring the measurement sub-resource in one compact measurement resource.

Figure 7:
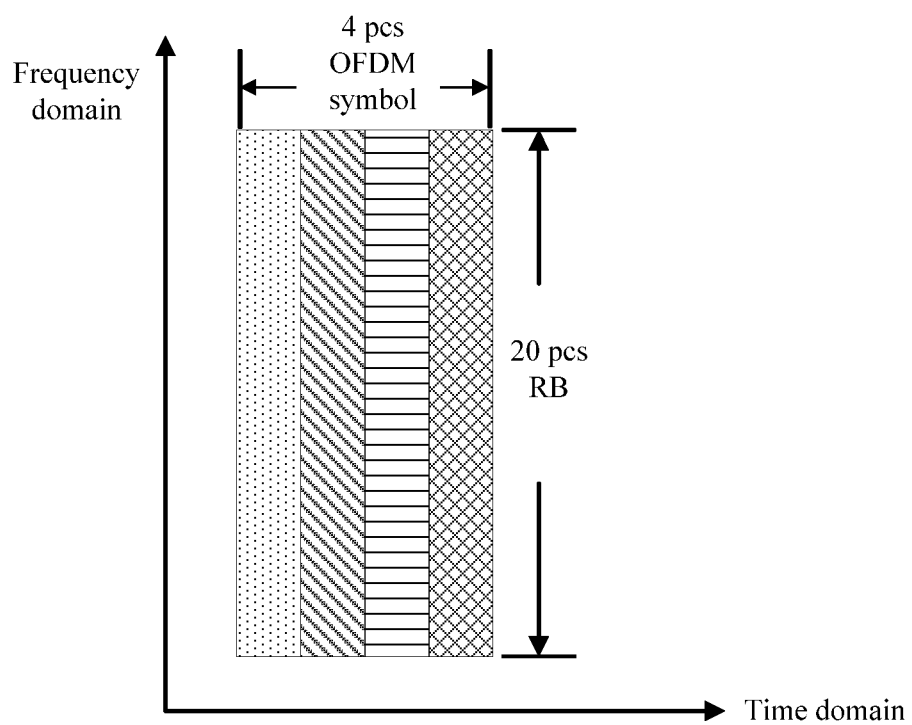
FIG. 7 is a schematic diagram of another measurement sub-resource configuration according to an embodiment of the present disclosure.
Figure 8:
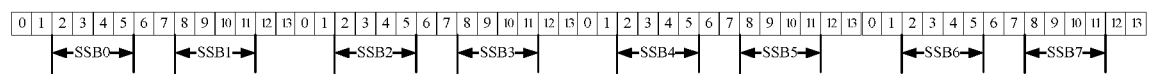
FIG. 8 is a schematic diagram of an SSB deployment according to an embodiment of the present disclosure.

As an alternative implementation manner of the embodiment of the present disclosure, the duration of the measurement sub-resource in the time domain is 4 OFDM symbols, and the bandwidth in the frequency domain is 20 resource blocks (RB), as shown in FIG. 7. If each measurement reference signal occupies 1 OFDM symbol, 4 measurement reference signals can be sent in the measurement sub-resource, and a maximum of 240 REs can be used in each OFDM symbol for receiving the measurement reference signal. In a specific application, although the duration and bandwidth of the measurement sub-resource are the same as those of an SSB, the measurement sub-resource can be used to send 4 measurement reference signals while the SSB can only be used to send 1 secondary synchronization signal (SSS). Therefore, a measurement reference signal can be sent in a centralized time-frequency resource by using the measurement sub-resource in this alternative embodiment, which reduces power consumption of the UE during channel measurement. In addition, a time-frequency resource position of the measurement sub-resource can be instructed by using higher layer signaling. For example, a new position in a 5 ms SSB burst set can be defined as the position of the measurement sub-resource. The measurement sub-resource may also be at a position of an indexed SSB. As shown in FIG. 8, a maximum of 8 SSBs can be sent in the frequency band of 3.5 GHz. In actual deployment, only 6 SSBs are used for coverage, and no SSB is sent at positions of the other 2 SSBs. For example, no SSB is sent at positions of SSBs with indexes 5 and 7, thus the measurement sub-resource can be at the positions of the SSBs with indexes 5 and 7, and for example, these two indexed SSBs can be indicated by using higher layer signaling, MAC CE or DCI as a time-frequency resource for transmitting the measurement reference signal.

In the embodiment of the present disclosure, each measurement reference signal includes: at least one of m sequence, ZC sequence, and gold sequence; or a product of at least two of m sequence, ZC sequence, and gold sequence.

In a specific application, the measurement reference signal is a sequence after modulating at least two sequences of the m sequence, the ZC (Zadoff-Chu) sequence, and the gold sequence. It should be noted that bit-level modulation is two modulo-2 additions of binary sequence, that is, scrambling, and symbol-level modulation is symbol-level multiplication after two sequences are mapped into a symbol. For example, the measurement reference signal is symbol-level multiplication of two m sequences, or symbol-level multiplication of a ZC sequence and a gold sequence.

In a specific application, a same sequence as that of a secondary synchronization signal (SSS) in the SSB or a same generator polynomial, generator parameter, and initial state as that of an SSS can be used for the measurement reference signal, but the sequence length is greater than 127. The measurement reference signal may also have a same sequence as that of CSI-RS, or have a same sequence as that of a demodulation reference signal (DMRS). It should be noted that although the embodiment of the present disclosure utilizes a same sequence as that of an SSS, a CSI-RS or a DMRS, a mapping mode of the measurement reference signal in the measurement resource in the embodiment of the present disclosure is different from that in the related art.

Figure 9:
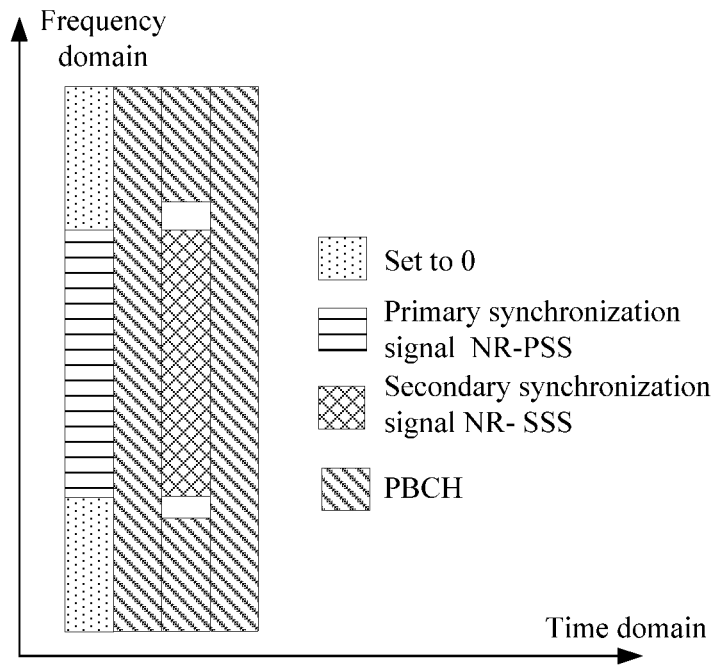
FIG. 9 is a schematic diagram of time-frequency domain transmission resource mapping of SSB in related art according to an embodiment of the present disclosure.

The following is only a specific description of a mapping mode of an SSS in the related art. FIG. 9 shows a schematic diagram of time-frequency domain transmission resource mapping of an SSB in the related art, where the SSB used for measurement occupies 240 REs in a frequency direction and 4 OFDM symbols in a time direction, which include a primary synchronization signal (PSS), an SSS, a physical broadcast channel (PBCH) signal and a DMRS of a PBCH. A mapping position of each signal in an SSB resource is shown in Table 1:

TABLE 1

| Channel or signal | OFDM symbol number in SSB time domain resource | Sub-carrier spacing number in SSB frequency domain resource |
|---|---|---|
| PSS | 0 | 56, 57, . . ., 182 |
| SSS | 2 | 56, 57, . . ., 182 |
| Set to 0 | 0 | 0, 1, . . ., 55, 183, 184, . . ., 239 |
| (Set to 0) | 2 | 48, 49, . . ., 55, 183, 184, . . ., 191 |
| PBCH | 1, 3 | 0, 1, . . ., 239 |
|  | 2 | 0, 1, . . ., 47, 192, 193, . . ., 239 |
| DMRS of PBCH | 1, 3 | 0 + v, 4 + v, 8 + v, . . ., 236 + v |
|  | 2 | 0 + v, 4 + v, 8 + v, . . ., 44 + v 192 + v, 196 + v, . . ., 236 + v | where $v = N_{ID}^{cell} \mod 4$.

It can be seen that the SSS in the related art is mapped on some resource elements in an SSB structure.

In the embodiment of the present disclosure, the measurement reference signal is not mapped on some resource elements in the SSB structure in the related art, but is mapped on a measurement sub-resource and/or a measurement resource. In the embodiment of the present disclosure, a mapping mode of the measurement reference signal in the measurement sub-resource and/or the measurement resource is configured by high layer signaling or determined by a preset mapping rule.

In a specific application, the high layer signaling can directly configure the mapping mode of the measurement reference signal in a measurement resource, or directly configure the mapping mode of the measurement reference signal in a measurement sub-resource.

In addition, the mapping mode of the measurement reference signal in the measurement sub-resource and/or the measurement resource may also be determined by a preset mapping rule. For example, in multiple measurement sub-resources of a measurement resource, each measurement reference signal may be transmitted and mapped on an ascending order of resource numbers and in an order of a frequency domain first and then a time domain, or each measurement reference signal may be transmitted and mapped on an ascending order of resource numbers and in an order of a time domain first and then a frequency domain, or according to another mapping rule, which is not specifically limited in the embodiment of the present disclosure. In each measurement sub-resource, each measurement reference signal is mapped on an ascending order of resource numbers in a time domain, or each measurement reference signal is mapped on a descending order of resource numbers in a time domain, or according to another mapping rule, which is not specifically limited in the embodiment of the present disclosure.

In the embodiment of the present disclosure, a quantity of OFDM symbols occupied by each measurement reference signal in a time domain is P, where $P \geq 1$ and P is an integer. In a specific application, the quantity of the OFDM symbols occupied by each measurement reference signal may be 1, or 2, or another value, which is not specifically limited in the embodiment of the present disclosure.

Figure 10:
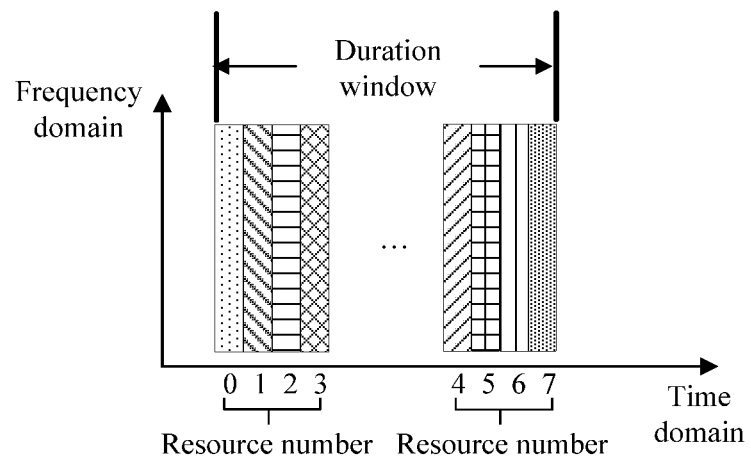
FIG. 10 is a schematic diagram of a mapping mode of a measurement reference signal on a measurement resource according to an embodiment of the present disclosure.

Taking that each measurement reference signal occupies 1 OFDM symbol in the time domain, a measurement resource includes a quantity of measurement sub-resources N=2, and each measurement sub-resource occupies 4 OFDM symbols in the time domain as an example, the measurement resource and a mapping mode of the measurement reference signal on the measurement resource is described. As an example of the embodiment of the present disclosure, a cell where the UE is located uses 8 beams for coverage, and the UE can complete channel measurement by receiving 8 measurement reference signals, where resource numbers of the 8 measurement reference signals are {0, 1, 2 . . . 7}. A mapping mode of the 8 measurement reference signals received by the UE on a measurement resource is mapping in an ascending order of the resource numbers in the time domain direction. As shown in FIG. 10, a measurement reference signal with resource number 0 is mapped on the first OFDM symbol, and a measurement reference signal with resource number 1 is mapped on the second OFDM symbol . . . . A measurement reference signal with resource number 7 is mapped on the last OFDM symbol. It should be noted that this example is only an illustration of a mapping mode of a measurement reference signal on a measurement resource, and it is not limited to such a mapping mode.

Figure 11:
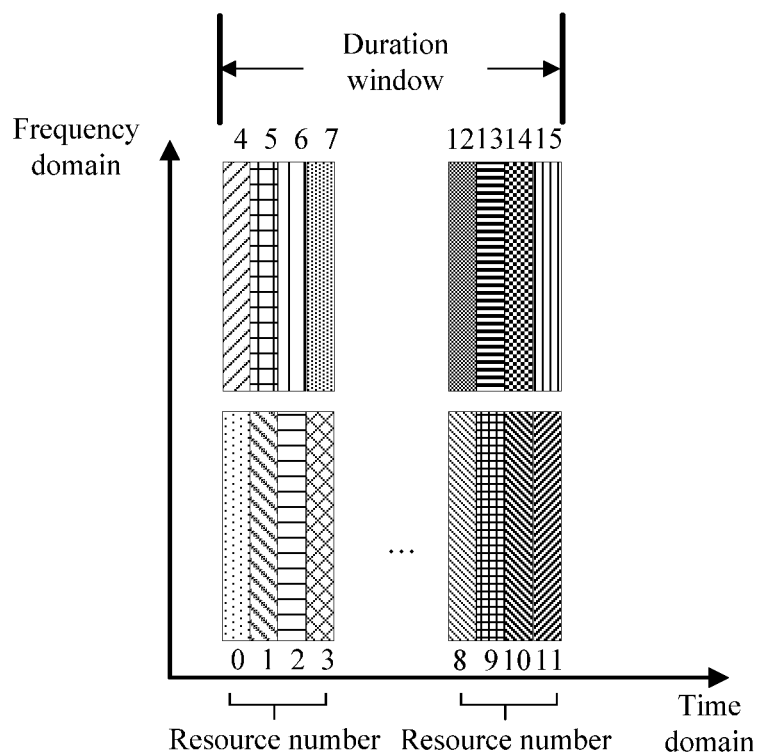
FIG. 11 is a schematic diagram of a mapping mode of another measurement reference signal on a measurement resource according to an embodiment of the present disclosure.

Taking that each measurement reference signal occupies 1 OFDM symbol in the time domain, a measurement resource includes a quantity of measurement sub-resources N=4, and each measurement sub-resource occupies 4 OFDM symbols in the time domain as an example, the measurement resource and a mapping mode of the measurement reference signal on the measurement resource is described. As another example of the embodiment of the present disclosure, a cell where the UE is located uses 16 beams for coverage, and the UE can complete channel measurement by receiving 16 measurement reference signals, where resource numbers of the 16 measurement reference signals are [0, 1, 2 . . . 15]. A mapping mode of the 16 measurement reference signals received by the UE in a measurement resource is: in multiple measurement sub-resources of the measurement resource, each measurement reference signal can be transmitted and mapped on an ascending order of the resource numbers and in an order of a frequency domain first and then a time domain. That is, as shown in FIG. 11, measurement reference signals with resource numbers 0-3 are first mapped on measurement sub-resource 0, measurement reference signals with resource numbers 4-7 are then mapped on measurement sub-resource 1, measurement reference signals with resource numbers 8-11 are then mapped on measurement sub-resource 2, and measurement reference signals with resource numbers 12-15 are then mapped on measurement sub-resource 3. It should be noted that the numbers of the measurement sub-resources in FIG. 11 are the same as those in FIG. 5, and FIG. 11 no longer shows the numbers of the measurement sub-resources. In addition, in each measurement sub-resource, each measurement reference signal is mapped on an ascending order of resource numbers in the time domain, that is, as shown in FIG. 11, in measurement sub-resource 0, a measurement reference signal with resource number 0 is mapped on the first OFDM symbol of measurement sub-resource 0, a measurement reference signal with resource number 1 is mapped on the second OFDM symbol of measurement sub-resource 0, a measurement reference signal with resource number 2 is mapped on the third OFDM symbol of measurement sub-resource 0, and a measurement reference signal with resource number 3 is mapped on the fourth OFDM symbol of measurement sub-resource 0. In measurement sub-resource 1, a measurement reference signal with resource number 4 is mapped on the first OFDM symbol of measurement sub-resource 1, a measurement reference signal with resource number 5 is mapped on the second OFDM symbol of measurement sub-resource 1, a measurement reference signal with resource number 6 is mapped on the third OFDM symbol of measurement sub-resource 1, and a measurement reference signal with resource number 7 is mapped on the fourth OFDM symbol of measurement sub-resource 1. A mapping mode of a measurement reference signal in measurement sub-resource 2 and measurement sub-resource 3 is similar to the foregoing mapping mode of the measurement reference signal in measurement sub-resource 0 and measurement sub-resource 1. For details, reference may be made to the mapping mode in measurement sub-resource 0 and measurement sub-resource 1. It should be noted that this example is only an illustration of a mapping mode of a measurement reference signal on a measurement resource, and it is not limited to such a mapping mode.

As an alternative implementation manner of the present disclosure, a quantity of times that M measurement reference signals are repeatedly sent on a measurement resource is P, where $P \geq 2$ and P is an integer.

Figure 12:
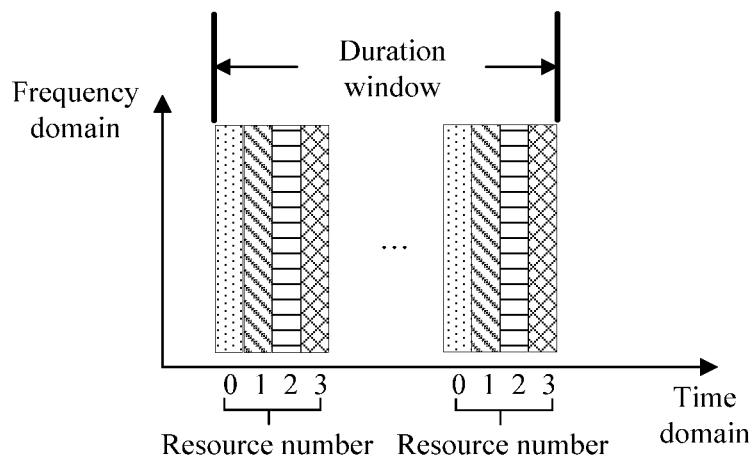
FIG. 12 is a mapping mode of a measurement reference signal when the measurement reference signal is repeatedly sent according to an embodiment of the present disclosure.

As an example of this alternative implementation manner, a cell where the UE is located uses 4 beams for coverage, and the UE can complete channel measurement by receiving 4 measurement reference signals. As shown in FIG. 12, if each measurement reference signal occupies 1 OFDM symbol in a time domain, a measurement resource includes N=2 measurement sub-resources in the time domain and each measurement sub-resource occupies 4 OFDM symbols in the time domain, the 4 measurement reference signals can be repeatedly received twice on a predefined measurement resource or a measurement resource configured by high layer signaling. The UE's measurement accuracy can be improved by measuring more pilots in each beam direction.

As another example of this alternative implementation manner, a cell where the UE is located uses 8 beams for coverage, and the UE can complete channel measurement by receiving 8 measurement reference signals. As shown in FIG. 13, if each measurement reference signal occupies 1 OFDM symbol in a time domain, a quantity of measurement sub-resources included in a measurement resource in the time domain is N=4 and each measurement sub-resource occupies 4 OFDM symbols in the time domain, the 8 measurement reference signals can be repeatedly received twice on a predefined measurement resource or a measurement resource configured by high layer signaling. The UE's measurement accuracy can be improved by measuring more pilots in each beam direction.

As an alternative implementation manner of the embodiment of the present disclosure, higher layer signaling is used to instruct that different measurement reference signals satisfy a QCL relationship, or a QCL relationship between different measurement reference signals is determined according to a predefined rule.

In a specific application, a predefined rule may be that measurement reference signals with a same mod (A, B) value satisfy a Quasi Co-Location (QCL) relationship, where A is a resource number of the measurement reference signal, and B is a predefined numeric value. For example, a maximum quantity of SSBs in a frequency band may be predefined as B; in a frequency range less than 3 GHz, B=4; in a frequency range of 3 to 6 GHz, B=8; and in a frequency range greater than 6 GHz, B=64. Description is made only with B=4 in the following. As shown in FIG. 10, resource numbers of measurement reference signals received by UE are $\{0, 1, \ldots 7\}$, measurement reference signals with resource numbers 0 and 4 satisfy a QCL relationship, and measurement reference signals with resources numbers of 1 and 5 satisfy a QCL relationship, measurement reference signals with resource numbers 2 and 6 satisfy a QCL relationship, and measurement reference signals with resource numbers 3 and 7 satisfy a QCL relationship. As an NR system is based on multi-beam transmission, signal reception needs to be based on a preferred receiving beam to achieve better reception performance. If it is determined that two measurement reference signals satisfy a QCL relationship, the UE can use a same receiving beam for reception. In the case that it is clear that a QCL relationship is satisfied between different measurement reference signals, it is convenient for the UE to determine a preferred receiving beam, avoiding complexity caused by repeated beam training.

As an alternative implementation manner of the embodiment of the present disclosure, a QCL parameter of each measurement reference signal is the same or different. It should be noted that a QCL parameter includes at least one of the following: an average delay, a delay spread, a Doppler frequency shift, a Doppler spread, a spatial reception parameter, and an average gain.

In a specific application, a QCL parameter may be indicated according to a QCL type. For example, if the QCL type is QCL-TypeA, the QCL parameter is a Doppler frequency offset, a Doppler spread, an average delay and a delay spread; if the QCL type is QCL-TypeB, the QCL parameter is a Doppler frequency offset and a Doppler spread; if the QCL type is QCL-TypeC, the QCL parameter is a Doppler frequency offset and an average delay; and if the QCL type is QCL-TypeD, the QCL parameter is a spatial reception parameter.

As an alternative implementation manner of the embodiment of the present disclosure, a QCL type can be configured by using higher layer signaling, MAC CE or DCI, for example, the QCL type can be indicated by RRC dedicated signaling, that is, which parameter is QCL.

In the embodiment of the present disclosure, a QCL parameter of each measurement reference signal is the same or different. In a specific application, a QCL parameter of each measurement reference signal may be the same or different. For example, as shown in FIG. 10, measurement reference signals with resource numbers 0 and 4 satisfy a QCL relationship, and a QCL type of the measurement reference signals with resource numbers 0 and 4 is QCL-TypeA, that is, a parameter that satisfies QCL is a Doppler frequency offset, a Doppler spread, an average delay and a delay spread; measurement reference signals with resource numbers 1 and 5 satisfy a QCL relationship, and a QCL type of the measurement reference signals with resource numbers 1 and 5 may also be QCL-TypeA, that is, a parameter that satisfies QCL may also be a Doppler frequency offset, a Doppler spread, an average delay and a delay spread; measurement reference signals with resource numbers 2 and 6 satisfy a QCL relationship, and a QCL type of the measurement reference signals with resource numbers 2 and 6 is QCL-TypeB, that is, a parameter that satisfies QCL may be a Doppler frequency offset and a Doppler spread; measurement reference signals with resource numbers 3 and 7 satisfy a QCL relationship, and a QCL type of the measurement reference signals with resource numbers 3 and 7 is QCL-TypeC, that is, a parameter that satisfies QCL may be a Doppler frequency offset and an average delay. It can be seen that the QCL parameter of the resource numbers $\{0,4\}$ are the same as that of the resource numbers $\{1,5\}$, and the QCL parameter of the resource numbers $\{1,5\}$ is different from the resource numbers $\{2,6\}$.

As an alternative implementation manner of the embodiment of the present disclosure, periodic transmission of a measurement reference signal or semi-persistent (semi-persistent) transmission of a measurement reference signal is configured by using higher layer signaling. A PDCCH may also be used to configure aperiodic transmission of a measurement reference signal.

As an alternative implementation manner of the embodiment of the present disclosure, each measurement reference signal is configured by at least one of the following indicated by higher layer signaling, MAC CE or DCI: a cell index, a cell index list, sub-carrier spacing, a cyclic prefix (CP) length, a scrambling number used for generation of a measurement reference signal, a power offset of a measurement reference signal relative to a secondary synchronization signal SSS in an SSB, an index of an SSB that satisfies a QCL relationship with a measurement reference signal, and a resource number of a CSI-RS that satisfies a QCL relationship with a measurement reference signal, and a QCL type of a measurement reference signal. It should be noted that the cyclic prefix CP includes a normal CP and an extended CP. The normal CP has 7 OFDM symbols in each time slot, and the extended CP has 6 OFDM symbols in each time slot. In addition, UE may calculate energy per resource element (EPRE) of a measurement reference signal according to a power offset (power offset) of the measurement reference signal relative to an SSS.

In the embodiment of the present disclosure, as shown in FIG. 14, the channel measurement method further includes step S202:

S202: Perform measurement and calculation for a channel according to the M measurement reference signals to obtain a channel measurement result; or, perform measurement and calculation for a channel according to the M measurement reference signals and a first measurement signal to obtain a channel measurement result, where the first measurement signal includes at least one of a secondary synchronization signal SSS in an SSB, a demodulation reference signal DMRS of a physical broadcast channel PBCH and a CSI-RS.

As an alternative implementation manner of the embodiment of the present disclosure, at least one of the M measurement reference signals is associated with a synchronization signal block SSB; and/or, at least one of the M measurement reference signals is associated with a channel state information-reference signal CSI-RS.

As an alternative implementation manner of the embodiment of the present disclosure, an SSB associated with the measurement reference signal and the measurement reference signal satisfy a quasi co-location (QCL) relationship; and/or a CSI-RS associated with the measurement reference signal satisfies a QCL relationship with the measurement reference signal.

In a specific application, the association relationship between the measurement reference signal and the SSB may be configured by higher layer signaling, MAC CE or DCI. For example, an index of the SSB may be configured to satisfy the QCL relationship with the measurement reference signal by higher layer signaling, MAC CE or DCI. The UE may perform measurement and calculation jointly based on the measurement reference signal and the SSB satisfying the QCL relationship with the measurement reference signal, and use EPRE to linearly average a channel measurement result.

In addition, the association relationship between the measurement reference signal and the CSI-RS may also be configured by higher layer signaling, MAC CE or DCI. For example, an index of the CSI-RS may be configured to satisfy the QCL relationship with the measurement reference signal by high-layer signaling, MAC CE or DCI. The UE may perform measurement and calculation jointly based on the measurement reference signal and the CSI-RS satisfying the QCL relationship with the measurement reference signal, and use EPRE to linearly average a channel measurement result.

As an alternative implementation manner of the embodiment of the present disclosure, the M measurement reference signals have at least one of the following functions: measurement on radio resource management (RRM), and measurement evaluation on radio link monitoring (RLM), measurement evaluation on beam failure detection (BFD), and acquisition of channel state information (CSI), for example, including reference signal received power (RSRP), reference signal received quality (RSRQ), a signal to interference plus noise ratio (SINR), a received signal strength indicator (RSSI), and the like for reporting level 3 (Level 3, L3); measurement reporting of RSRP, a channel quality indicator (CQI), a precoding matrix indicator (PMI) and/or a rank indicator (RI), and the like that are used for level 1 (L1).

As an alternative implementation manner of the embodiment of the present disclosure, in a measurement resource, or in a time slot or symbol where the measurement reference signal is located, assumptions made by the UE includes at least one of the following: the UE assumes that no uplink scheduling will be performed, where the uplink scheduling includes at least one of a physical uplink shared channel PUSCH, a physical downlink control channel PDCCH, a physical random access channel PRACH, and a sounding reference signal SRS; the UE assumes that no downlink scheduling will be performed, where the downlink scheduling includes at least one of a physical downlink shared channel PDSCH, a physical downlink control channel PDCCH, and a CSI-RS; the UE assumes that it will not be configured as an uplink time slot or an uplink symbol by high layer signaling; and the UE assumes that it will not be configured as an uplink time slot or an uplink symbol by downlink control information DCI.

In a specific application, if the UE performs uplink scheduling on an OFDM symbol sent by a measurement reference signal, such as a PUSCH, a PUCCH, a PRACH, an SRS, the UE abandons RRM measurement based on the measurement reference signal. In addition, if the UE receives scheduling of PDSCH at a transmission position of a measurement reference signal, the UE performs rate matching according to a transmission resource of the measurement reference signal; or instructs whether it is necessary to perform rate matching on the transmission measurement reference signal resource in a PDCCH for scheduling a PDSCH.

The present disclosure sets N measurement sub-resources on a measurement resource, and as each measurement sub-resource is contiguous in a time domain and a frequency domain, the UE only needs to continuously receive measurement reference signals on the N measurement sub-resources in the time domain or frequency domain when performing channel measurement, thus reducing processing time for the UE to perform the channel measurement, and reducing power consumption of the UE. In addition, measurement of the measurement reference signal can be completed in a short time period, which can prevent LBT (Listen Before Talk) from failing and prevent insufficient resources for sending the measurement reference signal.

The embodiments of the present disclosure further provide a channel measurement method, which is applied to a network side device, and as shown in FIG. 15, includes step S1501:

S1501: Send M measurement reference signals to user equipment UE on a measurement resource, where M is an integer greater than 1; the measurement resource includes N measurement sub-resources, and each measurement sub-resource is contiguous in a time domain and a frequency domain, where N≥1 and N is an integer.

Alternatively, a duration of each measurement sub-resource in a time domain is predefined or configured by higher-layer signaling; and/or, a bandwidth of each measurement sub-resource in a frequency domain is predefined or configured by higher-layer signaling.

Alternatively, a position of each measurement sub-resource in the measurement resource is configured by high layer signaling.

Alternatively, a mapping mode of each measurement reference signal in the measurement sub-resource and/or the measurement resource is configured by high layer signaling or determined by a preset mapping rule.

Alternatively, a duration of the N measurement sub-resources in a time domain is less than a first value, where the first value is predefined or configured by higher layer signaling.

Alternatively, the quantity of the measurement sub-resources N included in the measurement resource is predefined or configured by high layer signaling.

Alternatively, the quantity of the measurement sub-resources N is less than the quantity of the measurement reference signals M, that is, N<M.

Alternatively, a QCL parameter of each measurement reference signal is the same or different.

Alternatively, at least one of the M measurement reference signals is associated with a synchronization signal block SSB; and/or, at least one of the M measurement reference signals is associated with a channel state information-reference signal CSI-RS.

Alternatively, an SSB associated with the measurement reference signal and the measurement reference signal satisfy a QCL relationship; and/or a CSI-RS associated with the measurement reference signal and the measurement reference signal satisfy a QCL relationship.

Alternatively, a QCL parameter includes at least one of the following: an average delay, a delay spread, a Doppler frequency shift, a Doppler spread, a spatial reception parameter, and an average gain.

Alternatively, each measurement reference signal includes: at least one of m sequence, ZC sequence, and gold sequence; or a product of at least two of m sequence, ZC sequence, and gold sequence.

Alternatively, the measurement resource is configured by at least one of the following indicated by high layer signaling, media access control layer control element MAC CE, or downlink control information DCI: a period, a start frame, a start subframe, a start time slot, a start symbol, a duration, a frequency domain position and a bandwidth of the measurement resource.

Alternatively, each measurement reference signal is configured by at least one of the following indicated by higher layer signaling, MAC CE or DCI: a cell index, a cell index list, sub-carrier spacing, a cyclic prefix CP length, a scrambling number used for generation of a measurement reference signal, a power offset of a measurement reference signal relative to a secondary synchronization signal in an SSB, an index of an SSB that satisfies a QCL relationship with a measurement reference signal, and a resource number of a CSI-RS that satisfies a QCL relationship with a measurement reference signal, and a QCL type of a measurement reference signal.

Alternatively, the M measurement reference signals have at least one of the following functions: measurement on radio resource management RRM, and measurement evaluation on radio link monitoring RLM, measurement evaluation on beam failure detection BFD, and acquisition of channel state information CSI.

Alternatively, in a measurement resource, or in a time slot or symbol where the measurement reference signal is located, assumptions made by the UE includes at least one of the following:
- the UE assumes that no uplink scheduling will be performed, where the uplink scheduling includes at least one of a physical uplink shared channel PUSCH, a physical downlink control channel PDCCH, a physical random access channel PRACH, and a sounding reference signal SRS;
- the UE assumes that no downlink scheduling will be performed, where the downlink scheduling includes at least one of a physical downlink shared channel PDSCH, a physical downlink control channel PDCCH, and a CSI-RS;
- the UE assumes that it will not be configured as an uplink time slot or an uplink symbol by high layer signaling; and
- the UE assumes that it will not be configured as an uplink time slot or an uplink symbol by downlink control information DCI.

Alternatively, periodic transmission of a measurement reference signal or semi-persistent (semi-persistent) transmission of a measurement reference signal is configured by using higher layer signaling. A PDCCH may also be used to configure aperiodic transmission of a measurement reference signal.

It should be noted that, in order to avoid repetition, the present disclosure no longer describes a measurement resource for sending a measurement reference signal, a measurement sub-resource, a measurement reference signal, and the like in details.

The present disclosure sets N measurement sub-resources on a measurement resource, and as each measurement sub-resource is contiguous in a time domain or a frequency domain, the UE only needs to continuously receive measurement reference signals on the N measurement sub-resources in the time domain or frequency domain when performing channel measurement, thus reducing time for processing another signal when the UE performs the channel measurement, and reducing power consumption of the UE.

The embodiments of the present disclosure further provide user equipment. As shown in FIG. 16, the user equipment 1600 includes a receiving module 1601, where the receiving module 1601 is configured to receive M measurement reference signals sent by a network side device on a measurement resource, where M is an integer greater than 1; the measurement resource includes N measurement sub-resources, and each measurement sub-resource is contiguous in a time domain and a frequency domain, where N≥1 and N is an integer.

The user equipment further includes a measurement and calculation module 1602, where
- the measurement and calculation module 1602 is configured to perform measurement and calculation for a channel according to the M measurement reference signals to obtain a channel measurement result; or
- the measurement and calculation module 1602 is configured to perform measurement and calculation for a channel according to the M measurement reference signals and a first measurement signal to obtain a channel measurement result, where the first measurement signal includes at least one of an SSS in an SSB, a DMRS of a PBCH, and a CSI-RS.

The present disclosure sets N measurement sub-resources on a measurement resource, and as each measurement sub-resource is contiguous in a time domain and a frequency domain, the UE only needs to continuously receive measurement reference signals on the N measurement sub-resources in the time domain or frequency domain when performing channel measurement, thus reducing time for processing another signal when the UE performs the channel measurement, and reducing power consumption of the UE.

The embodiments of the present disclosure further provide a network side device. As shown in FIG. 17, the network side device 1700 includes a sending module 1701, where the sending module 1701 is configured to send M measurement reference signals to user equipment UE on a measurement resource, where M is an integer greater than 1;
- the measurement resource includes N measurement sub-resources, and each measurement sub-resource is contiguous in a time domain and a frequency domain, where N≥1 and N is an integer.

The present disclosure sets N measurement sub-resources on a measurement resource, and as each measurement sub-resource is contiguous in a time domain and a frequency domain, the UE only needs to continuously receive measurement reference signals on the N measurement sub-resources in the time domain or frequency domain when performing channel measurement, thus reducing time for processing another signal when the UE performs the channel measurement, and reducing power consumption of the UE.

Figure 18:
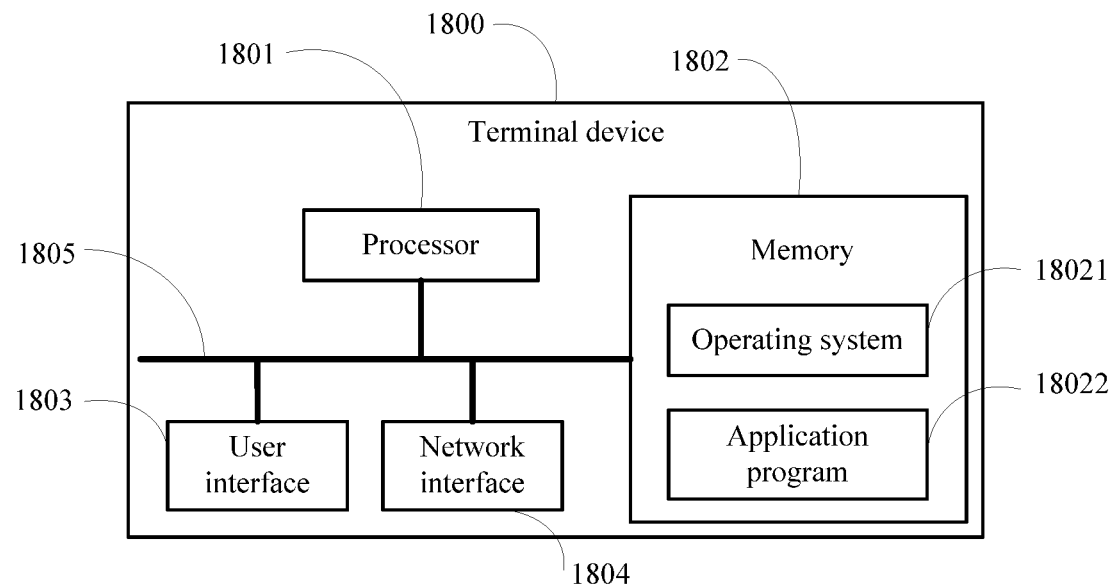
FIG. 18 is a structural diagram of another piece of user equipment according to an embodiment of the present disclosure.

In the embodiments of the present disclosure, as shown in FIG. 18, FIG. 18 is a structural diagram of user equipment according to an embodiment of the present disclosure. As shown in FIG. 18, user equipment 1800 includes: at least one processor 1801, a memory 1802, at least one network interface 1804, and a user interface 1803. Various components of the user equipment 1800 are coupled by using a bus system 1805. It may be understood that the bus system 1805 is configured to implement a connection and communication between these components. In addition to a data bus, the bus system 1805 may include a power bus, a control bus, and a status signal bus. However, for clarity of description, various buses are marked as the bus system 1805 in FIG. 18.

The user interface 1803 may include a display, a keyboard, a clicking device, for example, a mouse, a trackball, a touch panel, or a touchscreen.

It may be understood that the memory 1802 in this embodiment of the present disclosure may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. As exemplary but not limitative descriptions, many forms of RAMs may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 1802 in the system and the method that are described in this embodiment of the present disclosure is to include but is not limited to these memories and a memory of any other proper type.

In some implementations, the memory 1802 stores the following element: an executable module or a data structure, a subset thereof, or an extended set thereof: an operating system 18021 and an application program 18022.

The operating system 18021 includes various system programs, for example, a framework layer, a kernel library layer, and a driver layer, and is configured to implement various basic services and process hardware-based tasks. The application program 18022 includes various application programs, for example, a media player (Media Player) and a browser (Browser), and is configured to implement various application services. A program for implementing the method in the embodiments of the present disclosure may be included in the application program 18022.

In the embodiments of the present disclosure, the user equipment 1800 further includes: a computer program stored in the memory 1802 and executable on the processor 1801. When the computer program is executed by the processor 1801, the following step is performed:

receive M measurement reference signals sent by a network side device on a measurement resource, where M is an integer greater than 1; the measurement resource include N measurement sub-resources, and each measurement sub-resource is contiguous in a time domain and a frequency domain, where n≥1 and N is an integer.

When the computer program is executed by the processor 1801, the following step is also performed: perform measurement and calculation for a channel according to the M measurement reference signals to obtain a channel measurement result; or, perform measurement and calculation for a channel according to the M measurement reference signals and a first measurement signal to obtain a channel measurement result, where the first measurement signal includes at least one of a secondary synchronization signal SSS in an SSB, a demodulation reference signal DMRS of a physical broadcast channel PBCH and a CSI-RS.

The method that is disclosed in the embodiment of the present disclosure shown in FIG. 2 and executed by user equipment may be applied to the processor 1801 or implemented by the processor 1801. The processor 1801 may be an integrated circuit chip having a signal processing capability. During implementation, the steps of the foregoing method can be completed by hardware integrated logic circuits in the processor 1801 or instructions in the form of software. The foregoing processor 1801 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1801 may implement or execute the methods, steps, and logic block diagrams disclosed in the embodiment of the present disclosure shown in FIG. 2. The general-purpose processor may be a microprocessor or may be any conventional processor or the like. The steps of the method disclosed in the embodiment of the present disclosure shown in FIG. 2 may be directly performed by a hardware decoding processor or by a combination of hardware and software modules in the decoding processor. The software module may be located in a mature computer readable storage medium in this field such as a random access memory, a flash memory, a read-only memory, a programmable read-only memory or an electrically erasable programmable memory, or a register. The computer readable storage medium is located in the memory 1802, and the processor 1801 reads information from the memory 1802 and completes the steps of the foregoing method in combination with its hardware. Specifically, the computer readable storage medium stores a computer program, and when the computer program is executed by the processor 1801, the steps of the foregoing embodiment of channel measurement are performed.

It can be understood that those embodiments described in the embodiments of the present disclosure shown in FIG. 2 may be implemented with hardware, software, firmware, middleware, microcode, or a combination thereof. For implementation with hardware, the processing unit may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation with software, the technology described in the embodiments of the present disclosure may be implemented by executing functional modules (for example, a process and a function) described in the embodiments of the present disclosure. Software codes can be stored in the memory and executed by the processor. The memory can be implemented inside or outside the processor.

The embodiments of the present disclosure further provide a computer readable storage medium, which stores one or more programs, and the one or more programs include an instruction. When the instruction is executed by a communication device including multiple application programs, the communication device can execute the method of the embodiment shown in FIG. 2, and is specifically used for executing steps of the channel measurement method described above.

Figure 19:
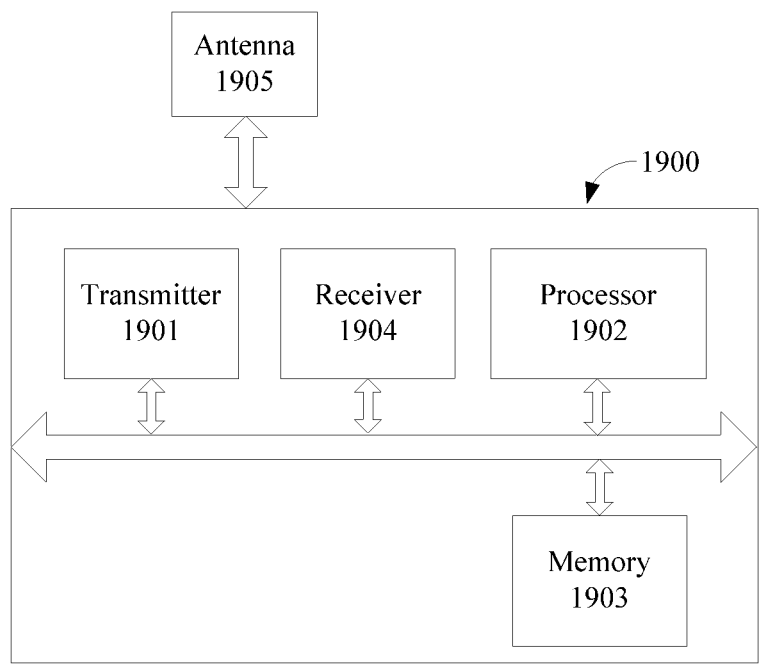
FIG. 19 is a structural diagram of another network side device according to an embodiment of the present disclosure.

The embodiments of the present disclosure further provide a network side device. As shown in FIG. 19. FIG. 19 is a structural diagram of a network side device according to an embodiment of the present disclosure. A structural diagram of a physical apparatus of a network side device 1900 may be as shown in FIG. 19, including a processor 1902, a memory 1903, a transmitter 1901 and a receiver 1904. In a specific application, the transmitter 1901 and the receiver 1904 may be coupled to an antenna 1905.

The memory 1903 is configured to store a program. Specifically, the program may include a program code, and the program code includes a computer operation instruction. The memory 1903 may include a read-only memory and a random access memory, and provide an instruction and data to the processor 1902. The memory 1903 may include a high-speed RAM memory, and may further include a non-volatile memory, for example, at least one magnetic disk storage.

The processor 1902 executes the program stored in the memory 1903.

Specifically, in the network side device 1900, the processor 1902 may perform the following method:
sending M measurement reference signals to user equipment UE on a measurement resource, where M is an integer greater than 1;
the measurement resource includes N measurement sub-resources, and each measurement sub-resource is contiguous in a time domain and a frequency domain, where N≥1 and N is an integer.

The method that is disclosed in the embodiment of the present disclosure shown in FIG. 15 and executed by a network side device may be applied to the processor 1902 or implemented by the processor 1902. The processor 1902 may be an integrated circuit chip having a signal processing capability. During implementation, the steps of the foregoing method can be completed by hardware integrated logic circuits in the processor 1902 or instructions in the form of software. The foregoing processor 1902 may be a general-purpose processor, including a central processing unit (CPU), a network processor (NP), and the like; the foregoing processor 1902 may also be a digital signal processor (DSP), an application-specific integrated circuit (ASIC), a field programmable gate array (FPGA) or another programmable logic device, a discrete gate or a transistor logic device, a discrete hardware component. The processor 1902 may implement or execute the methods, steps, and logic block diagrams disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature storage medium in this field such as a random access memory, a flash memory, a read-only memory, a programmable read-only memory or an electrically erasable programmable memory, or a register. The storage medium is located in the memory 1903. The processor 1902 reads information in the memory 1903, and completes steps of the foregoing channel measurement method in combination with its hardware.

The network side device can also perform the method shown in FIG. 15 and implement functions of the network side device in the embodiment shown in FIG. 15, which is no longer described here in the embodiment of the present disclosure.

The embodiments of the present disclosure further provide another computer readable storage medium, which stores one or more programs, and the one or more programs include an instruction. When the instruction is executed by a communication device including multiple application programs, the communication device can execute the method of the embodiment shown in FIG. 15, and is specifically used for executing steps of the channel measurement method described above.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element preceded by "includes a . . . " does not, without more constraints, preclude the presence of additional identical elements in the process, method, article, or apparatus that includes the element.

By means of the foregoing description of the embodiments, a person skilled in the art may clearly understand that the method in the foregoing embodiments may be implemented by software with a necessary general hardware platform. The method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely an example, but are not limiting. A person of ordinary skill in the art may make many forms without departing from the objective and the scope of the claims of the present disclosure.

The invention claimed is:

1. A channel measurement method, applied to user equipment (UE) and comprising:
receiving M measurement reference signals sent by a network side device on a measurement resource, wherein M is an integer greater than 1;
the measurement resource comprises N measurement sub-resources, and each measurement sub-resource is contiguous in a time domain and a frequency domain, wherein N≥1 and N is an integer;
wherein the measurement reference signal has a same sequence as that of a Secondary Synchronization Signal (SSS), or has a same sequence as that of a Channel State Information Reference Signal (CSI-RS), or has a same sequence as that of a Demodulation Reference Signal (DMRS).

2. The method according to claim 1, wherein
a duration of each measurement sub-resource in a time domain is predefined or configured by higher layer signaling; and/or a bandwidth of each measurement sub-resource in a frequency domain is predefined or configured by higher layer signaling.

3. The method according to claim 1, wherein a position of each measurement sub-resource in the measurement resource is configured by high layer signaling.

4. The method according to claim 1, wherein a mapping mode of each measurement reference signal in the measurement sub-resource and/or the measurement resource is configured by high layer signaling or determined by a preset mapping rule.

5. The method according to claim 1, wherein a duration of the N measurement sub-resources in a time domain is less than a first value, wherein the first value is predefined or configured by higher layer signaling.

6. The method according to claim 1, wherein at least one of the M measurement reference signals is associated with a synchronization signal block (SSB); and/or
at least one of the M measurement reference signals is associated with a channel state information-reference signal (CSI-RS).

7. The method according to claim 6, wherein the SSB associated with the measurement reference signal and the measurement reference signal satisfy a quasi co-location (QCL) relationship; and/or,
the CSI-RS associated with the measurement reference signal and the measurement reference signal satisfy a QCL relationship.

8. The method according to claim 1, further comprising:
performing measurement and calculation for a channel according to the M measurement reference signals to obtain a channel measurement result; or
performing measurement and calculation for a channel according to the M measurement reference signals and a first measurement signal to obtain a channel measurement result, wherein the first measurement signal comprises at least one of a secondary synchronization signal (SSS) in an SSB, a demodulation reference signal (DMRS) of a physical broadcast channel (PBCH) and a CSI-RS.

9. A channel measurement method, applied to a network side device and comprising:
sending M measurement reference signals to user equipment (UE) on a measurement resource, wherein M is an integer greater than 1;
the measurement resource comprises N measurement sub-resources, and each measurement sub-resource is contiguous in a time domain and a frequency domain, wherein N≥1 and N is an integer;
wherein the measurement reference signal has a same sequence as that of a Secondary Synchronization Signal (SSS), or has a same sequence as that of a Channel State Information Reference Signal (CSI-RS), or has a same sequence as that of a Demodulation Reference Signal (DMRS).

10. The method according to claim 9, wherein a duration of each measurement sub-resource in a time domain is predefined or configured by higher layer signaling; and/or a bandwidth of each measurement sub-resource in a frequency domain is predefined or configured by higher layer signaling;
and/or,
a position of each measurement sub-resource in the measurement resource is configured by high layer signaling;
and/or,
a mapping mode of the measurement reference signal in the measurement sub-resource and/or the measurement resource is configured by high layer signaling or determined by a preset mapping rule.

11. The method according to claim 9, wherein a duration of the N measurement sub-resources in a time domain is less than a first value, wherein the first value is predefined or configured by higher layer signaling.

12. The method according to claim 9, wherein at least one of the M measurement reference signals is associated with a synchronization signal block (SSB); and/or
at least one of the M measurement reference signals is associated with a channel state information-reference signal (CSI-RS).

13. The method according to claim 12, wherein the SSB associated with the measurement reference signal and the measurement reference signal satisfy a quasi co-location (QCL) relationship; and/or,
the CSI-RS associated with the measurement reference signal and the measurement reference signal satisfy a QCL relationship.

14. A network side device, comprising a processor, a memory, and a program stored in the memory and executable on the processor, wherein when the program is executed by the processor, steps of the channel measurement method according to claim 9 are implemented.

15. User equipment, comprising a processor, a memory, and a program stored in the memory and executable on the processor, wherein when the program is executed by the processor, the processor is configured to implement:
receiving M measurement reference signals sent by a network side device on a measurement resource, wherein M is an integer greater than 1;
the measurement resource comprises N measurement sub-resources, and each measurement sub-resource is contiguous in a time domain and a frequency domain, wherein N≥1 and N is an integer;
wherein the measurement reference signal has a same sequence as that of a Secondary Synchronization Signal (SSS), or has a same sequence as that of a Channel State Information Reference Signal (CSI-RS), or has a same sequence as that of a Demodulation Reference Signal (DMRS).

16. The user equipment according to claim 15, wherein, a duration of each measurement sub-resource in a time domain is predefined or configured by higher layer signaling; and/or
a bandwidth of each measurement sub-resource in a frequency domain is predefined or configured by higher layer signaling.

17. The user equipment according to claim 15, wherein, a position of each measurement sub-resource in the measurement resource is configured by high layer signaling.

18. The user equipment according to claim 15, wherein, a mapping mode of each measurement reference signal in the measurement sub-resource and/or the measurement resource is configured by high layer signaling or determined by a preset mapping rule.

19. The user equipment according to claim 15, wherein, a duration of the N measurement sub-resources in a time domain is less than a first value, wherein the first value is predefined or configured by higher layer signaling.

20. The user equipment according to claim 15, wherein,
at least one of the M measurement reference signals is associated with a synchronization signal block (SSB); and/or
at least one of the M measurement reference signals is associated with a channel state information-reference signal (CSI-RS).

* * * * *